May 28, 1957

C. A. CLARK 2,793,791

TIMED ROTARY DISPENSER

Filed Aug. 31, 1954

Calvin A. Clark
INVENTOR.

BY
*Attorneys*

May 28, 1957  C. A. CLARK  2,793,791
TIMED ROTARY DISPENSER
Filed Aug. 31, 1954  2 Sheets-Sheet 2
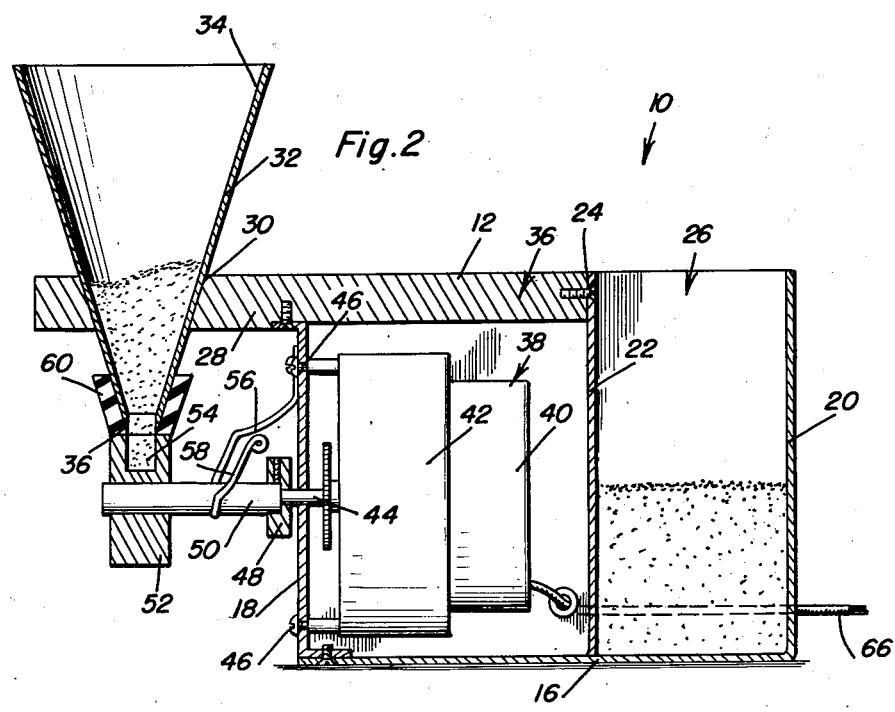
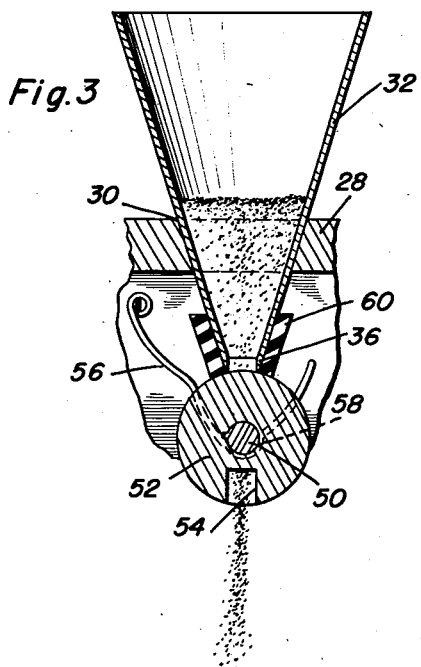
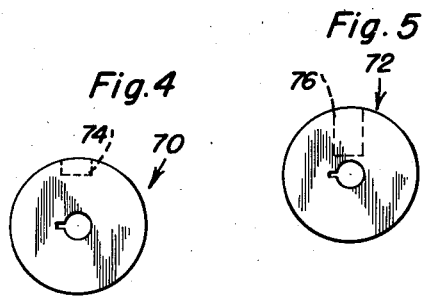
Calvin A. Clark
INVENTOR.

United States Patent Office 2,793,791
Patented May 28, 1957

2,793,791

TIMED ROTARY DISPENSER

Calvin A. Clark, Lompoc, Calif., assignor of one-half to William M. Holt, Lompoc, Calif.

Application August 31, 1954, Serial No. 453,234

4 Claims. (Cl. 222—185)

The present invention relates to an automatic food feeder for animals, fowl, fish and the like.

The primary objects of the invention is to provide an automatic food feeder for dispensing food into fish bowls and other similar feeding receptacles at predetermined intervals and is concerned basically with the feeding of small pets such as goldfish, mice, rabbits, chinchillas and the like, for long periods of time without any manual care in the feeding so that the owners of the pets may freely go on trips or otherwise remain away from the pets without the necessity for enlisting outside assistance to feed the pets during their absence.

A further object of the invention is to provide a small, compact, automatic feeding unit for small pets, which needs no particular mounting arrangement and is sufficiently small and adaptable to be mounted in any convenient place.

A still further object of the invention is in the provision of an automatic feeding device including a hopper and a feeding wheel for receiving food from the hopper and depositing this food in a pen, bowl or the like for the feeding of pets at predetermined intervals and which will remain operable for as long as the food supply lasts in the hopper.

A still further object of the invention is in the provision of the novel means for preventing food seepage between the feeding wheel and the hopper in an automatic feeding device.

A highly important object of the invention is in the provision of a novel feeding wheel for receiving food from the hopper and dispensing this food in the pet's pan or other receptacle.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 2 is a cross sectional view of the device taken substantially along the plane of section line 2—2 of Figure 1;

Figure 3 is a cross sectional view of a portion of the hopper and feeding wheel of the device taken substantially along the plane of section line 3—3 of Figure 1;

Figure 4 is a front view of a modified feeding wheel; and

Figure 5 is a front view of yet another feeding wheel.

Figure 1:
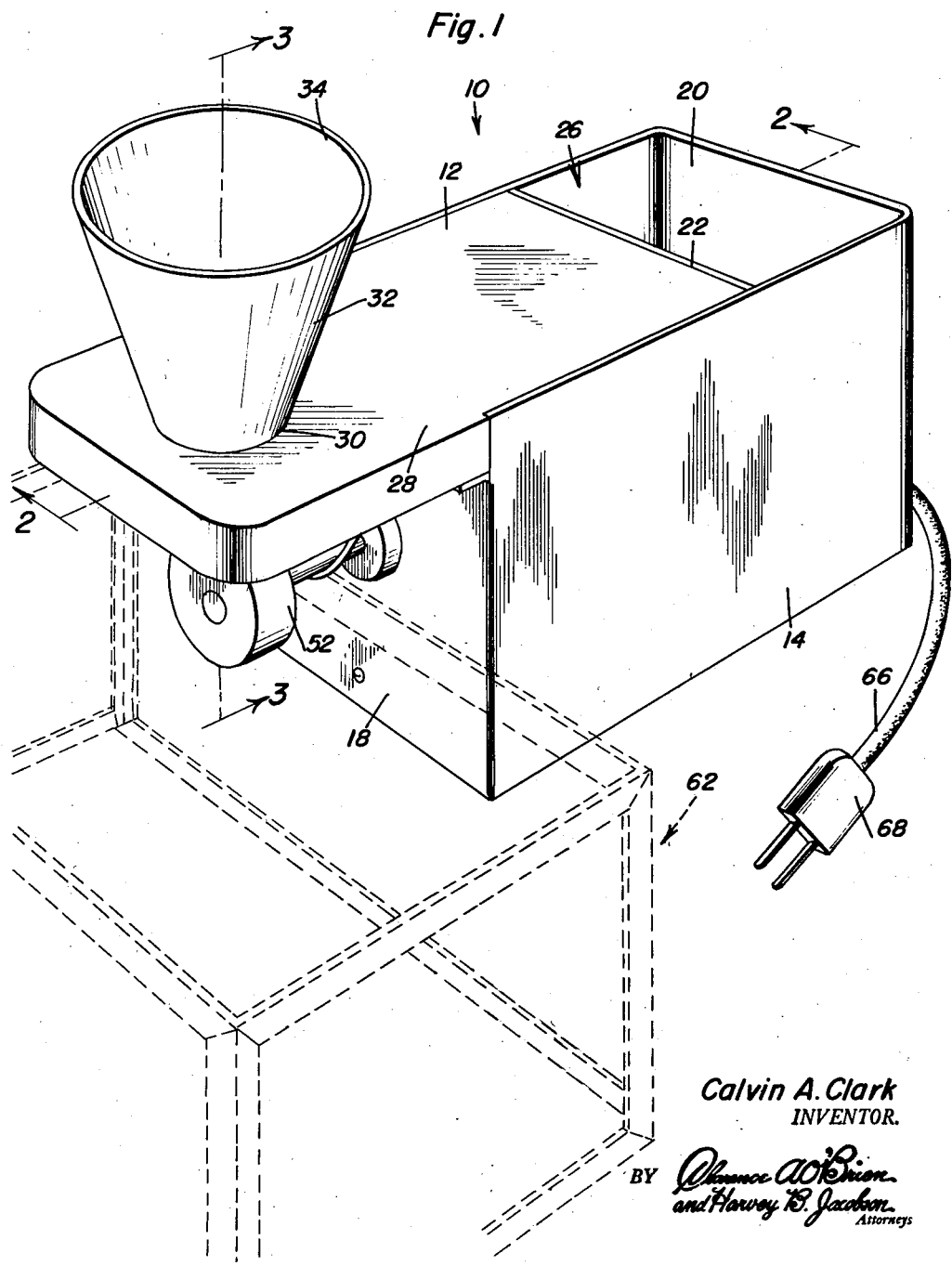
Figure 1 is a perspective view of the automatic feed device constituting the invention.

In the drawings, the automatic feeding unit is designated in its entirety by the numeral 10.

Basically, the unit consists of an elongated housing comprising top wall 12, side walls 14, bottom wall 16, front end wall 18 and rear end wall 20.

Intermediate the front and rear end walls 18 and 20, a partition wall 22 is disposed parallel to these walls. The top wall 12 terminates short of the rear end wall 20 and is secured at its rear end, designated by the numeral 24, to the upper end of the partition wall 22. Thus, the space between the partition wall 22 and the rear wall 20 serves as a food storage bin 26.

The forward end portion of the top wall 12 projects forwardly of the front end 18 of the housing as at 28. This forwardly projecting portion 28 is provided with a central, frusto-conically shaped aperture 30 within which is mounted the food hopper 32 of the automatic feeding device.

The food hopper 32 is in the form of an inverted, frusto-conical sleeve having a wide-mouthed upper end 34 for depositing food into the hopper and tapering down to a small-mouthed lower end 36. This constitutes a discharge opening for food from the hopper.

Within the chamber 36 bounded by the partition wall 22, front wall 18, side walls 14, top wall 12 and bottom wall 16, there is mounted a timing mechanism 38 in the form of an electric clock motor 20 and a clock mechanism 42. These elements are both conventional.

Preferably, the clock mechanism 42 is of the twelve-hour variety whereby the shaft 44 thereof would rotate once every twelve hours. Suitable fasteners 46 mount the clock mechanism 42 to the front wall 18 of the housing much as the same would be attached to a conventional casing for the mechanism. The hour shaft 44 of the clock mechanism is journaled through the front wall 18. A suitable adapter collar or the like 48 fixedly secures to the free end of the clock shaft 44 the feed wheel drive shaft 50 which extends beneath the lower end 36 of the hopper 32.

The feed wheel 52 which is in the form of a solid, cylindrical disc is keyed to the free end of the shaft 50 for rotation therewith or otherwise fixedly secured thereto. The periphery of the wheel is provided with a food receiving pocket or recess 54. This pocket is arranged in registry with the discharge opening 36 of the hopper 32.

In order to maintain the periphery of the feed wheel 52 in close proximity to or in abutment with the lower end 36 of the hopper 32, an elongated resilient, leaf-spring type wire element 56 is attached at one end thereof to one of the upper fasteners 46 mounting clock mechanism 42 within the chamber 36 and the resilient wire member has its other end portion rebent into a U-shaped saddle 58 which underlies the shaft 50 and urges the same upwardly toward the hopper 32 in resistance to the normal tendency of the shaft to drop by virtue of the weight of the feed wheel 52.

To prevent any spillage of food between the discharge end 36 of the hopper and the periphery of the feeding wheel 52, a resilient collar is slipped over the lower end of the hopper 32 and projects somewhat below the end of the hopper to lightly, frictionally and sealingly contact the periphery of the feeding wheel 22. The collar is designated by the numeral 60.

The operation of the device is exceedingly simple. Note in Figure 1, there is shown in phantom outline in this figure, a fish bowl or aquarium tank 62, the automatic feeding device 10 being mounted above the tank so that the hopper 32 and the feed wheel 52 overlie the tank. Consequently, when the electric clock motor 40 is plugged in to a suitable source of electricity through the line 66 and the plug 68, the shaft 50 and consequently the feed wheel 52 will begin to rotate, the rotation being determined by the clock mechanism utilized or the gearing ratio of the shafts 50 and 44 with respect to the mechanism being utilized. Ordinarily, a twelve hour per single revolution of the shaft is considered sufficient. Thus, every twelve hours the food pocket 54 on the feed wheel 52 will be filled by passing underneath and in registry with the discharge opening 36 in the hopper 32. Continued rotation of the feed wheel 52 dispenses the food received in the pocket 54 into the aquarium tank 62 to feed the fish therein.

Rather than change clock mechanisms or gearing ratios when the device is utilized to feed different pets, different type feeding wheels are keyed to the shaft 50, as needed.

As shown in Figures 4 and 5 wherein the feeding wheels 70 and 72 are disclosed, the amount of the feed may be very easily controlled by varying the depth of the pockets 74 and 76 respectively. Consequently, for different pets, it is only necessary to change feeding wheels 52, 70, 72 or any variety of feeding wheels as desired on the shaft 50.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. An automatic food feeder comprising a supporting means, a hopper carried by said supporting means and having a discharge opening in the lower end thereof, a feeding wheel having a periphery thereof closing said opening, means on said supporting means operatively connected to said feeding wheel for rotating the same at a predetermined rate, said wheel having a pocket formed in the periphery thereof registering with said discharge opening for receiving a charge of food from the hopper and dispensing it at intervals during the rotation of the wheel, said hopper having a resilient sleeve mounted on and depending beneath the lower end thereof in surrounding relation to the discharge opening, the rim of said wheel sealingly engaging the lower end of said sleeve, and a spring pressing said rim of said wheel against said resilient sleeve.

2. An automatic food feeder comprising a supporting means, a hopper carried by said supporting means and having a discharge opening in the lower end thereof, a feeding wheel having the periphery thereof closing said opening, drive means on said supporting means operatively connected to said feeding wheel for rotating the same at a predetermined rate, said wheel having a pocket formed in the periphery thereof registering with said discharge opening for receiving a charge of food from the hopper and dispensing it at timed intervals during the rotation of the wheel, said supporting means comprising a housing including top wall, bottom, and end walls, said top wall having a portion projecting forwardly beyond one of said end walls and provided with an aperture, said hopper being mounted in the aperture of said forwardly projecting portion, said drive means including a clock type motor mounted within said housing, a shaft projecting through said one end wall and coupled to said motor, and said feed wheel being fixedly attached to said shaft.

3. An automatic food feeder comprising a supporting means, a hopper carried by said supporting means and having a discharge opening in the lower end thereof, a resilient sealing sleeve at the lower end of said hopper, a feeding wheel having the periphery thereof closing said opening, drive means on said supporting means operatively connected to said feeding wheel for rotating the same at a predetermined rate, said wheel having a pocket formed in the periphery thereof registering with said discharge opening for receiving a charge of food from the hopper and dispensing it at intervals during the rotation of the wheel, said supporting means comprising a housing including top wall, bottom, and end walls, said top wall having a portion projecting forwardly beyond one of said end walls, said hopper being mounted on said forwardly projecting portion, said drive means including a clock type motor mounted within said housing, a shaft projecting through said one end wall and coupled to said motor, said feed wheel being fixedly attached to said shaft, an elongated spring secured to a wall of said supporting means and having a saddle formed therein accommodating said shaft to bias said feed wheel into sealing contact with the discharge opening of said hopper and said resilient sleeve.

4. An automatic food feeder dispensing food into fish bowls and other feeding receptacles comprising a supporting structure having a clock type motor and a food hopper carried thereby, a shaft coupled to said clock type motor for rotation thereby, a feed wheel mounted on said shaft and having a peripheral pocket therein, said hopper being mounted above said wheel and having a discharge opening at the lower end thereof, resilient means reacting against said shaft and said supporting structure urging said wheel toward said hopper, and a resilient sleeve on said hopper lower end engaging the periphery of said wheel to prevent spillage as food is deposited in the wheel pocket.

References Cited in the file of this patent

UNITED STATES PATENTS

| | | |
|---|---|---|
| 280,084 | Rose | June 26, 1883 |
| 579,245 | Terry | Mar. 23, 1897 |
| 735,167 | Steinberg | Aug. 4, 1903 |
| 895,346 | Da Costa et al. | Aug. 4, 1908 |
| 1,989,298 | Tingley | Jan. 29, 1935 |
| 2,428,241 | Pootjes | Sept. 30, 1947 |
| 2,500,243 | Dixon | Mar. 14, 1950 |
| 2,569,421 | Larson | Sept. 25, 1951 |
| 2,585,198 | Warren | Feb. 12, 1952 |
| 2,687,234 | McLauchlan | Aug. 24, 1954 |